United States Patent [19]
Ahvenniemi et al.

[11] Patent Number: 5,651,832
[45] Date of Patent: Jul. 29, 1997

[54] METHOD FOR CLEANING ROLLS

[75] Inventors: Vesa Ahvenniemi, Helsinki; Teuvo Lappalainen, Kerava, both of Finland

[73] Assignee: Valmet Corporation, Helsinki, Finland

[21] Appl. No.: 693,567

[22] Filed: Aug. 7, 1996

Related U.S. Application Data

[60] Continuation of Ser. No. 363,763, Dec. 23, 1994, abandoned, which is a division of Ser. No. 147,075, Nov. 3, 1993, abandoned.

[30] Foreign Application Priority Data

Nov. 3, 1992 [FI] Finland ................ 924961

[51] Int. Cl.⁶ .................. B08B 5/00; B08B 5/04
[52] U.S. Cl. .................. 134/21; 134/32; 134/33; 134/37
[58] Field of Search ............. 134/11, 15, 21, 134/31, 32, 33, 37, 10, 34, 122 R; 15/345; 34/122, 153

[56] References Cited

U.S. PATENT DOCUMENTS

| | | |
|---|---|---|
| 3,617,441 | 11/1971 | Farrell ................ 162/199 |
| 3,668,008 | 6/1972 | Severynse ............ 134/1 |
| 3,737,940 | 6/1973 | Moestue et al. ...... 15/302 |
| 3,741,157 | 6/1973 | Krause ............... 118/637 |
| 4,026,701 | 5/1977 | Till et al. ............ 92/1 R |
| 4,178,652 | 12/1979 | Adams et al. . |
| 4,185,399 | 1/1980 | Gladish . |
| 4,454,621 | 6/1984 | Testone . |
| 4,738,196 | 4/1988 | Boissevain . |
| 4,852,209 | 8/1989 | Svenka et al. . |
| 5,081,950 | 1/1992 | Martin et al. . |
| 5,092,961 | 3/1992 | Keller . |

FOREIGN PATENT DOCUMENTS

| | | |
|---|---|---|
| 0380427A3 | 8/1990 | European Pat. Off. . |
| 0520145A1 | 12/1992 | European Pat. Off. . |
| 73149 | 1/1988 | Finland . |
| 900433 | 7/1990 | Finland . |
| 920659 | 8/1992 | Finland . |

OTHER PUBLICATIONS

European Search Report, Application No. EP 93 11 7825, 1 Mar. 1994.
Annex to European Search Report, Application No. EP 93 11 7825, 3 Mar. 1944.
European Patent Office, Patent Abstract of Japanese Publication No. JP 63004948, Published Sep. 1, 1988.

Primary Examiner—Jill Warden
Assistant Examiner—Alexander Markoff
Attorney, Agent, or Firm—Cohen, Pontani, Lieberman, Pavane

[57] ABSTRACT

A method and apparatus for cleaning the surface of a backing roll in a coater or a calender roll. The roll is cleaned by injecting steam from a steam injection chamber against the roll surface at a 15° angle counter to the rotational direction of the roll. Steam impinging on the surface performs effective removal of accumulated dirt and the detached dirt is carried away on the web without a deleterious effect on the quality of the web. Steam injected against the roll is vacuumed away from the roll surface via a suction chamber, whereby the cleaning steam is prevented from escaping to the surroundings.

10 Claims, 1 Drawing Sheet

METHOD FOR CLEANING ROLLS

This is a continuation of application Ser. No. 08/363,763, filed Dec. 23, 1994, now abandoned, which is a division of application Ser. No. 08/147,075, filed Nov. 03, 1993, now abandoned.

The present invention relates to a method for cleaning a calender roll, coater backing roll and similar objects concurrently with the operation of the equipment.

BACKGROUND OF THE INVENTION

1. Field of the Invention

The invention also concerns an apparatus for implementing said method.

2. Description of the Prior Art

Cleaning of coater backing rolls and calender rolls, particularly those of soft calenders has been necessary as long as such equipment has been in use. Dirt accumulates on the backing rolls as the coating mix penetrates the paper web during coating via the web pores and adheres onto the roll surface. The roll may also gather dirt as the coating mix finds access via holes in the base paper. Rolls of soft calenders accumulate adhering matter from dirt and coat dust carried over by the moving web and from areas of thick coats that have remained moist thus permitting their adherence on the roll surface. The penetration depth of the coating mix, and thus, its filtration through the web, is determined by the paper web porosity and thickness as well as the process conditions such as the application/doctor blade pressure and coating mix properties. With the modern trends of using a thin base web and a high coat weight, the coating mix is filtered in greater amounts through the base web thus resulting in heavier dirt accumulation on the rolls than encountered before. A coat clump adhered to the roll becomes firmly fixed to the roll through drying and then causes marking on the paper sheet. Paper quality degradation through marking obviously increases as the accumulation of dirt on the roll progresses.

Cleaning the rolls has in the prior art been performed by means of manual washing and doctoring with a doctor blade. Manual washing with a wetted sponge is clumsy and time-consuming and requires heavy manual labor. Due to high web speeds and greater tendency to dirt accumulation, the need for cleaning the rolls is frequent, since the rolls become dirty so rapidly. As the manual cleaning of the rolls is slow and accumulation of dirt is fast, manpower must be allocated on an almost continuous basis for the cleaning job. The work must be performed carefully, because no water drippage onto the running web is allowed and the operation must be carried out while the equipment is running. As modern equipment is designed for high web speeds and wide webs, manual cleaning of long rolls is extremely awkward and dangerous.

Manual washing of rolls can be replaced by the use of doctor blades. Such an arrangement performs dirt removal from roll surface with the help of a doctor blade. Water is used to aid cleaning. Drawbacks of cleaning by doctoring include splashing, wear of the roll surface by the doctor blade and poor function at high web speeds exceeding 10 m/s (600 m/min). Splashing results in an untidy working environment, and when water lands on the web, it spoils the paper sheet being processed. Owing to alignment tolerances between the roll to be cleaned and the doctor blade, the doctor blade imposes an uneven linear load on the roll causing a high wear rate of both the blade and the roll. Due to the extremely stringent requirements set on the roll straightness, even a slightest wear of the roll leads to impairment of paper sheet quality thus necessitating roll replacement. The change of the expensive roll combined with the mandatory equipment shutdown adds up to higher operating costs.

In the light of the above-discussed, a modern roll cleaning method of higher practical usefulness is obviously needed.

SUMMARY OF THE INVENTION

It is an object of the present invention to achieve an apparatus capable of cleaning rolls in a coater and calender also in high-speed equipment at full operating speed.

The invention is based on applying a high-velocity steam jet to the surface of the roll being cleaned.

More specifically, the method according to the invention is characterized by injecting steam against the surface of the roll in a direction counter to the rotational direction of the roll.

Furthermore, the apparatus according to the invention is characterized by a plurality of adjacent steam chambers connected to means for applying steam to the roll to be cleaned. The steam applying means includes a steam injection chamber arranged between a last of the adjacent steam chambers, when viewed in the rotational direction of the roll, and the steam chamber adjacent thereto. The steam injection chamber has an exit that faces the roll so as to direct the steam to the roll. Steam channels are provided to direct the steam into each of the adjacent steam chambers so as to heat the chambers.

The invention provides significant benefits.

The steam jet performs effective removal of coat clumps and other dirt accumulated on the roll surface without damaging the roll. The steam released by the jet is vacuumed away close to the roll thereby avoiding any detrimental steam released to the environment. Particles detached from the roll surface are carried away by the paper web or vacuumed along with the steam flow. Thus, the annoying and dirt-spreading splashing is avoided. By controlling the amount and temperature of the steam applied to the roll surface to proper values, water accumulation on the roll surface in detrimental amounts is prevented, the washing process causes no change in paper qualities and the cleaning operation leaves no marks on the paper web. As the roll is not treated by mechanical means, the cleaning operation causes no wear and the roll life is increased relative to doctor blade cleaning and the paper quality is maintained good. The simplest embodiment of the cleaning apparatus has an extremely uncomplicated design.

The cleaning step can be easily automated for continuous operation in conjunction with a running process. In this fashion the control of roll cleanliness is improved, resulting in a lower rate of quality defects. Automated cleaning reduces the need for manpower allocation and removes a hazardous task. Steam cleaning is equally effective at all concurrent web speeds.

In the following the invention is described in greater detail with reference to the annexed drawings.

DETAILED DESCRIPTION OF THE PREFERRED EMBODIMENTS

Figure 1:
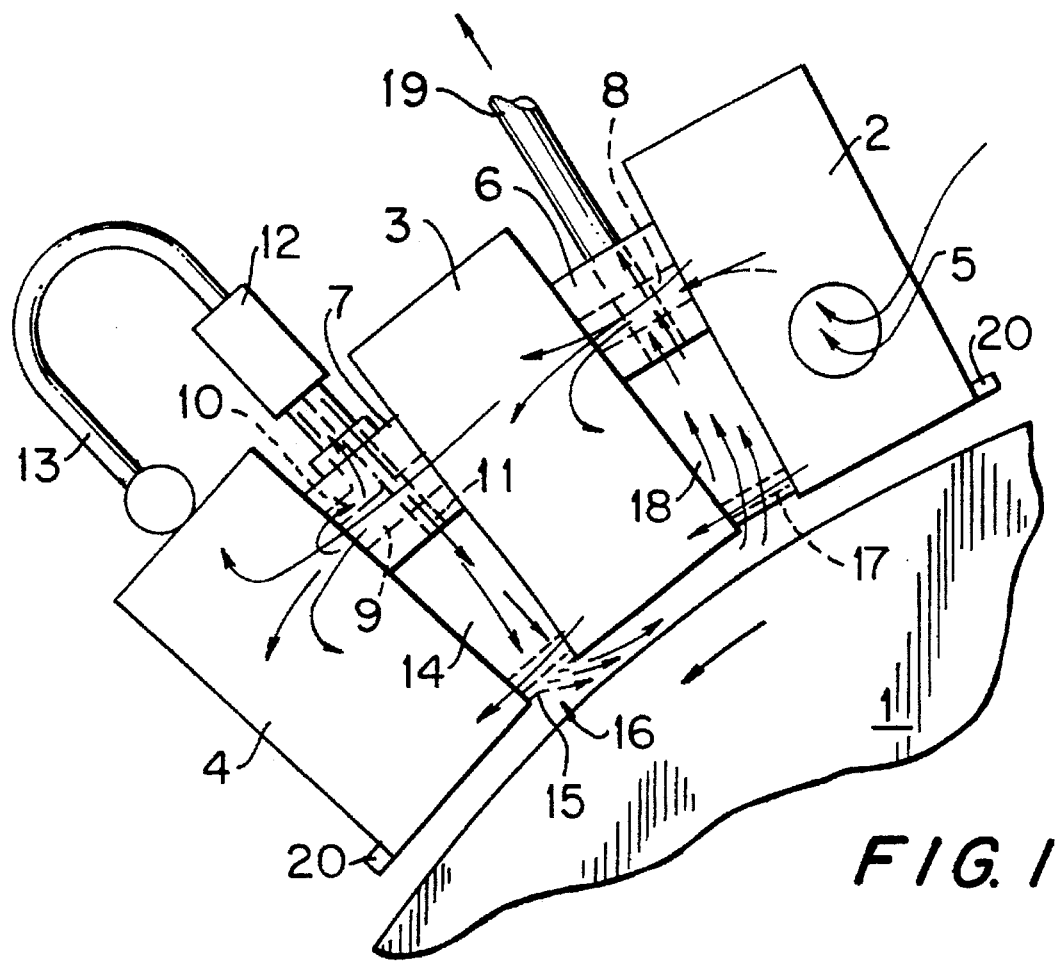
FIG. 1 shows a diagrammatic cross section of an embodiment of the apparatus according to the invention.

The cleaning apparatus comprises three steam chambers 2–4 connected to each other by intermediate compartments 6, 7. The first steam chamber 2 relative to the rotational direction of a roll 1 has a steam inlet pipe 5. The rotational direction is denoted by an arrow in the drawing. The intermediate compartment between the first steam chamber 2 and the second steam chamber 3 has a first steam channel 8, while the intermediate compartment 7 between the second steam chamber 3 and the third steam chamber 4 has a second steam channel 9. Exiting the third steam channel 4, a valve channel 10 is arranged to run within the second intermediate compartment to a valve 12, and an injection steam channel 11 is arranged to run from the valve 12 to a steam injection chamber 14 which is situated between the second steam chamber 3 and the third steam chamber 4 and has a perforated plate 15 adapted as its bottom wall. The perforated plate 15 is provided with orifice holes 16 aligned at a 20° angle to the rotational direction of the roll 1. Three rows of the orifice holes are usually employed. The number of the valves 12 is dependent on the cross-machine length of the apparatus; usually more than one valve is employed.

Between the first steam chamber 2 and the second steam chamber 3 is arranged a suction chamber 18 having a vacuum line 19 connected to its adjoining first intermediate compartment 6. The steam chambers 2–4 are connected by condensate channels 17 running within the end walls of the apparatus and a condensate outlet nozzle 20 is adapted to the first steam chamber 2 and the third steam chamber 4 for removal of condensed water.

The operation of the apparatus is as follows. Steam is fed to the first steam chamber 2 via the steam feed pipe 5. The steam travels from the first steam chamber 2 to the second steam chamber 3 via the first steam channel 8, and further therefrom via the second steam channel 9 to the third steam chamber 4. From the third steam chamber 4 the steam travels along the valve channel 10 to the valve 12. The valve 12 can he a pressure-controlled valve, for instance. When the steam pressure in the system is low at approx. 100 kPa, the steam is routed via the valve 12 to a steam outlet/header pipe 13. In this fashion the apparatus is maintained at elevated temperature by virtue of the circulating steam and condensation at the side parts of the apparatus is avoided. Prevention of condensation is absolutely mandatory, because water drippage on the roll and the web would cause immediate damage to the web. To avoid any cool surfaces facing the web, the apparatus must have at least three steam chambers. To this end the steam is fed into the first steam chamber 2 relative to the rotational direction of the roll, thus maintaining the chamber temperature above the condensation temperature. Similarly, the second steam chamber 3 and the third steam chamber 4 are heated by the circulating steam prior to routing the steam to either the roll 1 or the steam outlet/header pipe 13.

As the steam pressure in increased, the valve 12 opens into the injection steam channel 11 and the steam can enter the steam injection chamber 14, wherefrom it is injected at high velocity via the orifice holes 16 against the roll 1. Typically, the injection velocity of the steam jets is 100–300 m/s, whereby they impinge with a great force on the roll surface. When the jet hits a coat particle adhering to the surface of the roll 1, the hot superheated steam softens the coat particle binder material thus aiding the detachment of the particle. Such softening is relatively effective already at 120° C. which gives a guideline for proper steam temperature. Preferably, superheated steam is used in most cases. With the detachment of the particle, it is propelled by the steam jet counter the rotational direction of the roll 1 hitting anew the surface of the roll 1. While hitting the other still adhering coat particles, the detached particle causes further detachment of other material adhering to the roll surface thus enhancing the cleaning effect of the steam jet. Obviously, the alignment of the steam jets counter to the rotational direction of the roll is crucial for attaining a good cleaning result, and to this end the steam injection orifice holes 16 should be drilled to an angle of 15°–25° in the perforated plate 15. This angle must be understood so that said acute angle of 15°–25° is formed on the trailing side of roll between the center line of the orifice hole 16 and the tangent of the roll surface drawn at the intersection point of said center line with the roll surface.

The steam jet is conveyed through the gap between the roll 1 and the second steam chamber 3 toward the entrance slit of the suction chamber 18. The steam is withdrawn into the suction chamber 18 and further to the steam outlet/header pipe by means of a vacuum applied via the vacuum line 19. In this manner the cleaning steam is prevented from escaping to the surroundings. A portion of the dirt detached from the roll 1 is conveyed away along with the vacuumed steam, while most of the detached dirt remains on the roll surface and attaches to the web. Detached dirt attaching to the web will not be detrimental to the paper quality.

Figure 2:
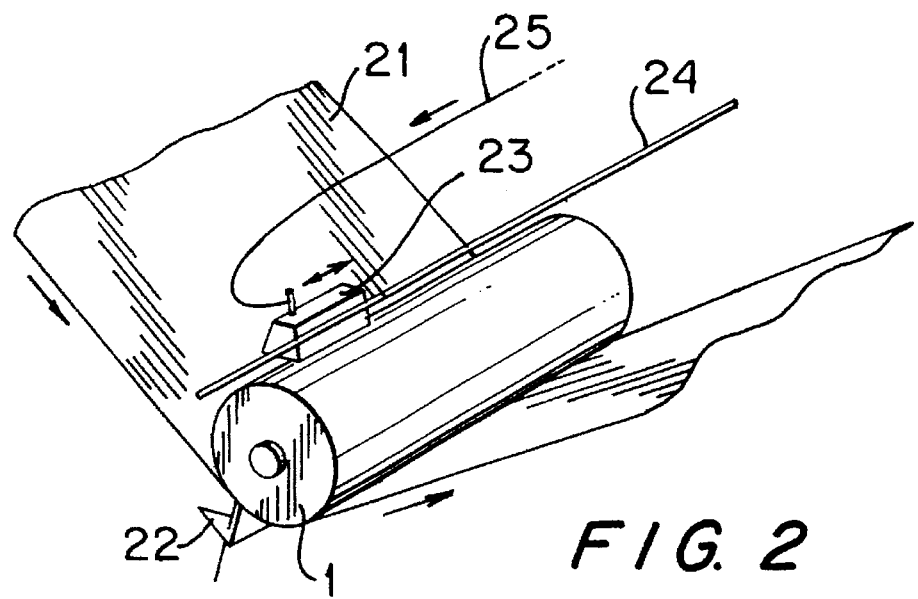
FIG. 2 shows in a diagrammatic perspective view of the apparatus illustrated in FIG. 1 adapted to a coater station.

In its most advantageous embodiment illustrated FIG. 2, the cleaning apparatus 23 is mounted on a guide rail 24 aligned parallel with the roll 1, whereby the apparatus need extend lengthwise only over a portion of the roll 1. The guide rail 24 overextends at least by the length of the cleaning apparatus 23 past the length of the roll 1, thereby permitting cleaning of the apparatus itself by withdrawing it aside. This is because the dirt detached from the roll 1 tends to adhere to the lower surfaces of the steam chambers 2–4 and next to detach from said surfaces in large clumps unless the accumulated material is removed sufficiently often. In the arrangement shown in FIG. 2, the cleaning apparatus 23 is mounted in conjunction with a coater station, whereby coater unit 22 is situated beneath the roll 1 and the web 21 passes through the nip between the coating unit and the roll 1.

The roll 1 is cleaned with the help of the apparatus shown in FIG. 2 by first transferring the apparatus along the guide rail 24 to the edge of the roll 1 and then switching on the steam feed. After a circumferential area of the roll 1 corresponding to the effective width of the cleaning apparatus is cleaned, the steam feed is switched off and the apparatus is transferred to the next position over the roll and the underlying circumferential area is cleaned. When the apparatus becomes soiled with dirt, it can be transferred aside and cleaned manually, for instance. The transfer and cleaning cycles of the apparatus can be fully automated, whereby the roll cleaning process takes place in a systematic manner not requiring dedicated personnel.

Besides those described above, the present invention can have alternative embodiments.

A transferrable apparatus can be replaced by a stationary apparatus extending over the entire length of the roll 1. In such an apparatus the valves can be grouped to include a few valves in each block. The blocks are switched on sequentially, whereby the function of the apparatus becomes identical to that of a transferrable apparatus. Alternatively, all valves can be controlled to open simultaneously, but such an arrangement requires a massive steam feed rate. A cleaning apparatus extending over the entire length of the roll 1 must be provided with a tilting mechanism or other arrangement which facilitates the transfer of the apparatus to a position permitting its cleaning.

The number of the valves as well as the grouping thereof into blocks can be varied in a desired manner. Since the type and model of the valves employed is not crucial to the function of the invention, their control can be arranged as required. When a larger area along the roll perimeter is desired to be cleaned, the number of steam chambers can be greater than three. Then, the feed and vacuuming of the steam can be arranged to occur in multiple stages. The routing of the steam circulation can be arranged in different ways, for instance, by feeding the steam first into the trailing chamber relative to the rotational direction of the roll and therefrom to the other chambers. However, the steam circulation is advantageously arranged to meet the valve as the last component of the steam circuit, whereby the temperature of the steam passing via the valve cannot be higher than the temperature of the other components of the apparatus heated by the steam. Further, the steam jets can be employed alone without steam removal by vacuum, whereby the apparatus can have, for instance, two steam chambers to both sides of the steam injection chamber. However, such an arrangement suffers from the steam released to the surroundings.

Obviously, the steam required for heating the steam chambers can be routed separately to each chamber, but such an embodiment has an unnecessarily complicated design. In an embodiment designed for a cross-directional transfer of the cleaning apparatus over the length of the roll, any suitable arrangement can be employed for implementing the transfer movement.

What is claimed is:

1. A method for cleaning a surface of a roll rotating in a rotating direction, comprising:

providing a plurality of adjacent steam chambers connected in series:

placing said plurality of adjacent steam chambers in close proximity to the roll;

injecting steam into said plurality of adjacent steam chambers;

applying steam to the roll being cleaned so as to detach debris adhering to the roll, the steam being applied from a steam injection chamber situated between a last of the adjacent steam chambers relative to the rotational direction of the roll being cleaned and a steam chamber next to said last steam chamber, the steam injection chamber having an exit which faces the roll for applying steam to the roll to be cleaned;

vacuuming the applied steam and detached debris away from the surface of the roll being cleaned with a suction chamber displaced at a distance from said steam injection chamber in a direction counter to the rotational direction of the roll being cleaned whereby the roll is cleaned; and heating the adjacent steam chambers, the steam injection chamber and the suction chamber, by directing steam through a plurality of steam channels into the adjacent steam chambers.

2. A method as defined in claim 1, wherein the step of applying steam to the roll includes injecting steam as a jet having a velocity in a range of 100–300 m/s.

3. A method as defined in claim 1, wherein the steam applied to the roll is super-heated.

4. A method as defined in claim 1, wherein the step of applying includes injecting the steam cyclically from the steam injection chamber so that an area of the roll is cleaned first and then moving the steam injection chamber lengthwise along the roll and cleaning a different area.

5. A method as defined in claim 1, wherein said adjacent steam chambers, said steam injection chamber, and said suction chamber are heated in said heating step to a temperature substantially equal to the temperature of the steam applied to the roll from said steam injection chamber.

6. A method as defined in claim 5, wherein said adjacent steam chambers, said steam injection chamber, and said suction chamber are heated in said heating step to a temperature above a condensation temperature of the steam applied to the roll from said steam injection chamber.

7. A method as defined in claim 5, wherein said adjacent steam chambers, said stem injection chamber, and said suction chamber are heated in said heating step to a temperature above 120° C.

8. A method as defined in claim 1, wherein the steam is applied to the roll at an angle of from 15° to 25° relative to a tangent of the surface of the roll.

9. The method of claim 1, wherein the steam is injected from one of the plurality of adjacent steam chambers into the next.

10. The method of claim 9, wherein steam applied from the steam injection chamber to the roll being cleaned is supplied to the steam injection chamber by the last of the adjacent steam chambers.

* * * * *